(12) United States Patent
Schreckenberger

(10) Patent No.: US 6,378,500 B1
(45) Date of Patent: Apr. 30, 2002

(54) PRESSURE REGULATING VALVE FOR A FEEDING MODULE

(75) Inventor: Dieter Schreckenberger, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/630,262

(22) Filed: Aug. 1, 2000

(30) Foreign Application Priority Data

Aug. 19, 1999 (DE) .......................................... 199 36 843

(51) Int. Cl.⁷ ................................................ F02M 41/00
(52) U.S. Cl. ...................................... 123/457; 123/463
(58) Field of Search ................................ 123/457, 459, 123/462, 463; 137/87.01, 529

(56) References Cited

U.S. PATENT DOCUMENTS 5,381,816 A * 1/1995 Alsobrooks et al. ........... 137/15
5,394,900 A * 3/1995 Okuyama et al. ............ 137/510
5,429,094 A * 7/1995 Akiba et al. ................. 123/463
5,458,104 A * 10/1995 Tuckey ....................... 123/463
5,606,991 A * 3/1997 Kuribayashi ................ 123/463

FOREIGN PATENT DOCUMENTS

DE   1906 18 707 A1   11/1997
DE   196 34 899 A 1    3/1998

* cited by examiner

Primary Examiner—Thomas N. Moulis
(74) Attorney, Agent, or Firm—Michael J. Striker

(57) ABSTRACT

A pressure regulating valve has a valve chamber with a supply for connection to a pressure source. It also has a valve member which is placed on a seat surface in a valve body by a closing spring with an adjusting pressing force. A throttle opening is provided in the valve body to a return conduit. The pressure regulating valve is formed so that the valve member releases the throttle opening to the return conduit in correspondence with a load condition of an internal combustion engine, depending on its stroke path.

14 Claims, 1 Drawing Sheet

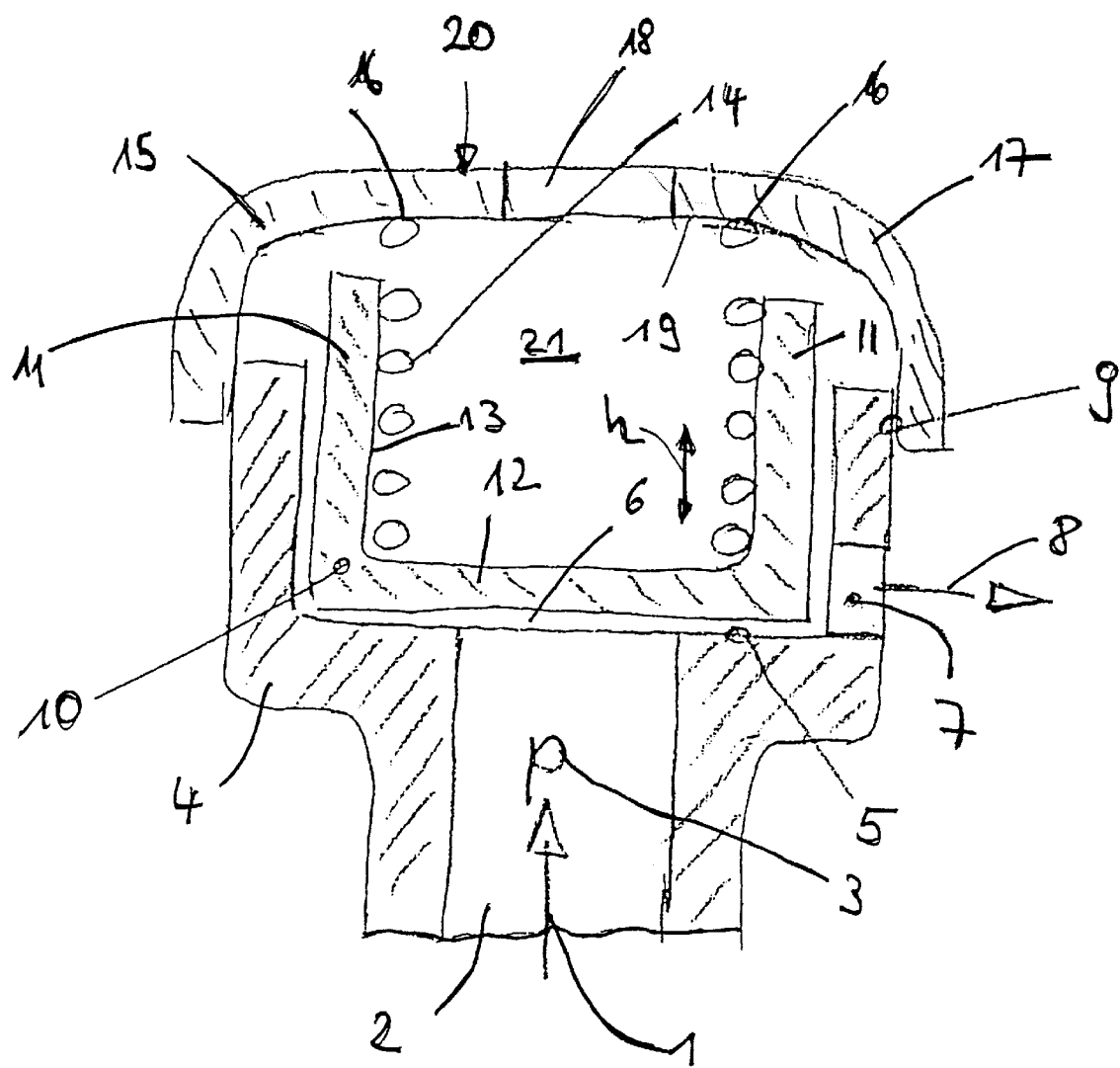

PRESSURE REGULATING VALVE FOR A FEEDING MODULE

BACKGROUND OF THE INVENTION

The present invention relates to pressure regulating valves for feeding modules, for example for regulation of a system pressure.

A pressure regulating valve of the above mentioned general type is known in the art. It is disclosed for example in the German patent document DE 196 34 899 81. A valve chamber of this pressure regulating valve is provided with an inlet and with a control chamber connected through a valve opening with a valve chamber. A valve member is loaded with a valve closing spring which has an adjustable spring force. The valve member is pressed by means of the valve closing spring to a valve seat which surrounds the valve opening. For compensation of the spring force increase, during a growing outflow quantity downstream of the valve opening a throttle surface is arranged. The throttle surface is arranged so that, between the valve member and the control chamber, at the valve member a pressure which is dependent on the throughflow counteracts the spring force of the closing spring.

The known arrangement has a relatively great structural space, and thereby the throttle surfaces are quite expensive. This involves an expensive manufacturing process, which unavoidably increase the manufacturing cost.

SUMMARY OF THE INVENTION

Accordingly, it is an object of present invention to provide a pressure regulating valve for a feeding module, which avoids the disadvantages of the prior art.

In accordance with the present invention the valve member in accordance with the load condition of an internal combustion engine releases the throttle opening toward the return conduit in correspondence with its stroke path.

In addition to the cost-favorable realization of the pressure regulation on a fuel feeding module, with the inventive solution a flat up to a negative characteristic line increase is realized after the opening point of the pressure regulating valve. Depending on the construction of the throttle opening around the valve body, a flat characteristic line increase or a negative characteristic line increase is obtained, which takes into consideration individual customer requirements.

In accordance with a preferable embodiment of the inventive solution, the closing spring which loads the valve member has a spring characteristic line as a function of the supply pressure applied to the valve member. The closing spring is supported at one end against a pressure element which is movable relative to the valve body and on the other hand against a valve member which is cup-shaped. The valve member in turn is arranged moveably in the bucket-shaped valve body relative to the latter.

For variable adjustment of the spring force acting on the valve member, the cover element can move relative to a valve body. Thereby the pretensioning of the spring member can be increased or reduced. In addition to the thread which is provided in a connection region between the cover element and the valve body and which makes possible a rotary connection between the cover element and the valve body, also a bajonet lock can be provided. It can engage in different resting positions on the periphery of the cover element or valve body. In addition to the formation of a thread with a greater or smaller thread pitch in the connecting region, also a clamping connection can be provided, which makes possible any relative position between the valve body and the valve member.

The throttle opening can be slot-shaped in an advantageous manner. It can be also formed as a borehole in the valve body. In addition to the design of the throttle opening as a slot or a borehole, the throttle opening can be also composed of two or several adjoining slots or boreholes. The return conduit can be connected to the throttle opening in the flowout region of the pressure regulating valve, to return the fuel again to the fuel tank.

In accordance with an advantageous embodiment of the solution proposed in the invention, the valve body can surround the valve member in a cup-shaped manner, so that a very compact construction of the pressure regulating valve is provided.

In accordance with another feature of present invention a method of regulation of a fuel feeding module is provided, in accordance with which a valve member performs a stroke in dependence on supply pressure which releases the cross-section in the throttle opening in a flowout region of the pressure regulating valve so that, after an opening point of the pressure regulating valve a flat to a negative characteristic line increase of the pressure regulating valve is provided.

With the method in accordance with the present invention, with the supply pressure-dependent actuation of a valve member, the stroke path of the valve member can be varied, so that the cross-section of the throttle opening, depending on loading condition of the internal combustion engine is released, after the opening point of the pressure valve is exceeded, and thereby a flat characteristic line, or depending on the design of the throttle opening, a negative characteristic line increase is produced.

The throttling at the throttle opening drops lower with an increase of feeding quantity through the pressure regulator during idle running. The throttling at the throttling opening is increased depending on the reduction of the feeding quantity through the pressure regulating valve during full load of the internal combustion engine, since only a small quantity of fuel can flowout through the throttle opening in the supply tank.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single figure of the drawing is a view showing a cross-section of an inventive pressure regulating valve which is connected with a pressure source.

DESCRIPTION OF THE PREFERRED EMBODIMENTS

A pressure regulating valve in accordance with the present invention is shown in FIG. 1 and is connected with a pressure source. The not shown pressure source feeds fuel through supply 1 into the pressure regulating valve. The fuel feeding which is under the supply pressure 3 enters the pressure regulating valve through the supply conduit 2. The pressure regulating valve includes a valve body 4 which is connected with a cover element 15 movable relative to the valve body. The bucket-shaped valve body 4 receives an adjusting member 13 which is formed for example as a piston. A throttle opening 7 is provided in the valve body 4 in an outflow region above a seat surface 5 for the adjusting member 10. A return conduit 8 extends laterally from the throttle opening 7 and not shown in detail.

A gap 6 is provided between the piston bottom 12 of the adjusting member 10 and the seat surface 5. It is filled with fuel which flows under the supply pressure 3 through the supply conduit 2. The fuel flows along the piston wall 11 and the valve chamber 21 and exits from there through the opening 18.

A piston provided in the bucket-shaped valve body 4 has an adjusting member 10 which is cup-shaped. At its inner side, the piston wall 11 operates as a guide for a closing spring 14. Its characteristic line is a function of pressure, or in other words S=f(p). The closing spring 14 is surrounded over a greater part of its longitudinal extension by the piston wall 11 of the adjusting member 10, so that it can not laterally deviate and the danger of buckling is reduced. The closing spring 14 is supported at one side against the bottom of the adjusting member 10 and at another side against the cover element 15 in a spring seat 16. The cover element 15 closes the valve body 4 from above and is received in a connecting region 9 at the upper end of the valve body 4 movably relative to the latter. The opening 18 formed, for example, as a borehole is provided in the cover element 15. A spring seat 16 is located at the inner side of the cover element 15. The cover element is screen-shaped, while the cover wall 17 extends to the upper end of the valve body 4 at both sides.

The cover element 15 can be provided for example with an inner thread, which cooperates with an outer thread in the connecting region 9 of the valve body 4. A turning of the cover element 15 leads thereby to a change of the spring characteristic, so that the closing spring 14 is pre-tensioned more or less. This influences the stroke path h covered by the. adjusting member 10 during action of the fuel pressure 3 on the piston surface 12. Thereby the throttle opening 7 is released in its cross-section more or less depending on the covered adjustment path h.

In addition to an inner/outer thread pair, a connection is also possible in the connecting region 9 between the cover element 15 and the valve body 4. At a periphery of the cover element 15 and valve body 4 in the connecting region 9 therefore several arresting positions can be provided. Depending on the selected arresting position between the cover element 15 and the valve body 4, the closing spring 14 is pre-tensioned more or less, whereby the spring force can be adjusted variably. In addition to the embodiment shown on the sketch for the moveable cover element 15 with valve body 4-combination, a clamping connection is also possible depending on the selected position of the cover element 15 relative to the valve body 4.

A throttle opening is provided in the valve body 4. Fuel exiting in the outflow region of the pressure regulating valve flows through the throttle opening 7 back into the supply tank. The throttle opening 7 can be slot shaped. Instead of a slot, also several slots can be arranged near one another, with the return conduit 8 connected to them and leading to the supply tank, which is not shown here. In addition to the embodiment of the throttle opening 7 as slot-shaped openings, also boreholes which are located near one another can be provided in the side wall of the valve body 4, depending on the requirements of customers.

The operation of the pressure regulating valve, which has a very simple construction and composed of a fuel component, is as follows.

When a great quantity of fuel flows during idle running of the internal combustion engine through the supply conduit 10 with the supply pressure 3 in the valve chamber 21, the piston surface 12 of the adjusting or valve member 10 is pressed upwardly in the upper direction of the double arrow H. Depending on a spring force of the closing spring 14 which is adjusted by preselection of the turning position of the cover element 15 relative to the valve body 4, the adjusting member 10 moves upwardly, whereby the piston wall 11 releases the throttle opening 7 more or less. As noted previously, the adjustable cover element 15 is mounted to the valve body 4 by a thread, in a connection area 9. By turning the cover element 15 relative to threaded portion 9 on the outer circumference of the valve body 4, a pretensioning of the spring element 14 can be achieved, which provides the biasing force for the valve member 10. In this load condition of the internal combustion engine, or in other words during idle running, a low throttling action on the throttle opening 7 takes place. Therefore, a relative low system pressure is provided, and a relatively great fuel quantity through the throttle opening 7 flows in the return conduit 8 to the supply tank.

During full load of the internal combustion engine, a relatively lower feed quantity of fuel enters the valve chamber 21, the adjusting member 10 is moved only little upwardly. Thereby also only a small cross-section surface in the throttle opening 7 is released and a stronger throttling action occurs. In the system therefore a higher system pressure is built up when compared with the above mentioned idle running condition.

Depending on the design of the throttle opening 7, in correspondence with the customer requirements, a flat characteristic line increase can be realized. Depending on the characteristic line requirement of customer, a negative characteristic line can be also provided. This is obtained by the designing and dimensioning of the throttle opening 7.

In accordance with the inventive method for pressure regulation of a fuel feeding module in correspondence with the respective load condition of an internal combustion engine, the valve member 10 can be controlled in dependence on the supply pressure 3 so that the cross-sectional surface of the throttle opening 7 in the flowout region of the pressure regulating valve can be released after the opening point of the pressure regulating valve, so that a flat characteristic line increase or a negative characteristic line increase is provided. Further parameters for determination of the regulating condition of the inventive pressure regulating valve can be for example a length of the piston walls 11 until abutment against the inner surface of the spring seat 16, or a length of the integrated closing spring 14 between the piston bottom of the adjusting member 10 and the spring seat 16.

With the spring characteristic F=f(p), the length of the piston wall 11 and the position of the cover element 15 relative to the valve body 4, different spring characteristic can be adjusted, depending on the requirements. The characteristic line increase, whether flat or negative, is provided by dimensioning of the throttle opening 7 depending on customer requirements, which therefore provide a high application flexibility of the inventive pressure regulating valve.

It will be understood that each of the elements described above, or two or more together, may also find a useful application in other types of constructions differing from the types described above.

While the invention has been illustrated and described as embodied in pressure regulating valve for a feeding module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure regulating valve, comprising a valve body; a valve chamber; a supply for connecting to a pressure source; a valve member; a closing spring with an adjustable spring force which sets said valve member on a seat surface, said valve body having a throttle opening, said valve member releasing said throttle opening to a return conduit in correspondence with a stroke path, in dependence on a loading condition of an internal combustion engine, wherein said closing spring has a spring force $F=f(p)$ as a function of a supply pressure.

2. A pressure regulating valve as defined in claim 1, wherein said closing spring is arranged between an adjustable cover element and said valve member which is guided in said valve body.

3. A pressure regulating valve as defined in claim 2, wherein said cover element is movable relative to said valve body.

4. A pressure regulator valve as defined in claim 2, wherein said cover element and said valve body are connected with one another in a connecting region through a thread.

5. A pressure regulating valve as defined in claim 3, wherein in a connection region between said cover element and said valve body several arresting positions are arranged with bayonet lock.

6. A pressure regulating valve as defined in claim 3, wherein said cover element and said valve body are provided with a clamping connection which is clampable in various positions.

7. A pressure regulating valve as defined in claim 1, wherein said throttle opening is slot-shaped.

8. A pressure regulating valve as defined in claim 1, wherein said throttle opening is formed as a borehole.

9. A pressure regulating valve as defined in claim 1, wherein said throttle opening is formed by a plurality of slots.

10. A pressure regulating valve as defined in claim 1, wherein said throttle opening is formed by a plurality of boreholes.

11. A pressure regulating valve as defined in claim 1, wherein said valve body surrounds said valve member in a cup-shaped manner.

12. A method of regulating a fuel feeding module in correspondence with a load condition of an internal combustion engine, comprising the following steps:

covering a stroke path by a valve member in dependence on a supply pressure; and releasing a cross-section of a throttle opening in a flowout region of a pressure regulating valve variably, whereby, after an opening of the pressure regulating valve, a flat characteristic line increase or a negative characteristic line increase of the pressure regulating valve takes place.

13. A method as defined in claim 12; and further comprising the step of running a throttle at the throttle opening lower in dependence on an increase of a feeding quantity through a pressure regulator during an idle running of the internal combustion engine.

14. A method as defined in claim 12; and further comprising throttling at the throttle opening greater with a reduction of a feeding quantity through the pressure regulator with a full load of the internal combustion engine.

* * * * *